(12) United States Patent
Knaven

(10) Patent No.: US 7,331,629 B2
(45) Date of Patent: Feb. 19, 2008

(54) CHILD BICYCLE SEAT

(75) Inventor: Franciscus Arnoldus Knaven, Doesburg (NL)

(73) Assignee: Dremefa B. V., Doesburg (NL)

( * ) Notice: Subject to any disclaimer, the term of this patent is extended or adjusted under 35 U.S.C. 154(b) by 0 days.

(21) Appl. No.: 11/507,883

(22) Filed: Aug. 22, 2006

(65) Prior Publication Data
US 2007/0046085 A1 Mar. 1, 2007

(30) Foreign Application Priority Data
Aug. 31, 2005 (NL) .................................. 1029841

(51) Int. Cl.
*A47D 1/10* (2006.01)
*B62J 7/00* (2006.01)
(52) U.S. Cl. ............... 297/250.1; 297/243; 280/202
(58) Field of Classification Search ............. 280/288.4, 280/202, 32.7, 33.993, 727, 801.2; 297/250.1, 297/468, 467, 243
See application file for complete search history.

(56) References Cited
U.S. PATENT DOCUMENTS

| | | | |
|---|---|---|---|
| 3,910,634 A * | 10/1975 | Morris | 297/467 |
| 4,440,331 A * | 4/1984 | Schimmels | 224/415 |
| 5,082,325 A * | 1/1992 | Sedlack | 297/468 |
| 6,371,563 B1 | 4/2002 | Washizuka | |
| 6,811,216 B2 * | 11/2004 | Sedlack | 297/250.1 |
| 2005/0110318 A1 | 5/2005 | Meeker et al. | |

FOREIGN PATENT DOCUMENTS

| | | |
|---|---|---|
| CA | 1 213 510 | 4/1986 |
| EP | 0 462 930 B1 | 8/1994 |
| EP | 1 380 464 A2 | 1/2004 |
| WO | WO 2005/012033 A1 | 2/2005 |

* cited by examiner

*Primary Examiner*—Milton Nelson, Jr.
(74) *Attorney, Agent, or Firm*—Hoffmann & Baron, LLP

(57) ABSTRACT

The invention relates to a child bicycle seat comprising a seating surface and a backrest and also fixing means for fixing the seat on a bicycle. The child bicycle seat furthermore comprises a belt assembly for securing a child in the seat. The belt assembly comprises two shoulder belt parts which are connected by one end to the backrest and are provided with a closing element. A second closing element which can be connected to the closing element of the shoulder belt parts is connected to the seating surface of the seat and in use lies between the legs of the child. The child bicycle seat is provided with a common tautening device for tautening the belt assembly.

19 Claims, 3 Drawing Sheets

CHILD BICYCLE SEAT

CROSS-REFERENCE TO RELATED APPLICATIONS

This application claims the benefit of Netherlands Application No. 1029841, filed Aug. 31, 2005, the contents of which are incorporated herein by reference.

BACKGROUND OF THE INVENTION

The invention relates to a child bicycle seat. The child bicycle seat comprises a seating surface and a backrest and fixing means for fixing the child seat on a bicycle. Furthermore, the child bicycle seat comprises a belt assembly for securing a child in the seat. The belt assembly comprises two shoulder belt parts which are connected by one end to the backrest and are provided with a closing element. The seat has also a second closing element which can be connected to the closing element of the shoulder belt parts and is connected to the seating surface of the seat.

Such a child bicycle seat is known. In the case of the known child bicycle seat both shoulder belts are provided with an adjusting buckle by means of which the length of each of the shoulder belts can be varied by sliding the buckle along the shoulder belt concerned. Adjusting the length of the belt can be a laborious operation in practice.

SUMMARY OF THE INVENTION

The invention aims to provide an improved child bicycle seat.

This aim is achieved according to the invention by a child bicycle seat comprising a seating surface and a backrest, fixing means for fixing the seat on a bicycle, and also a belt assembly for securing a child in the seat. The belt assembly comprises two shoulder belt parts which are connected by one end to the backrest and are provided with a closing element. The seat also comprises a second closing element which can be connected to the closing element of the shoulder belt parts and is connected to the seating surface of the seat. The child bicycle seat is provided with a common tautening device for tautening the parts forming part of the belt assembly, in particular the shoulder belt parts.

The child bicycle seat according to the invention is provided with a common tautening device for tautening the parts forming part of the belt assembly, in particular the shoulder belt parts. Owing to this common tautening facility, the two shoulder belt parts, and possibly other parts of the belt assembly, do not have to be adjusted separately, so that adapting the belt assembly to the size of the child becomes simpler. This can be particularly advantageous if the child is wearing thick clothing on one occasion and thinner clothing on another occasion. The belt assembly advantageously can be adapted to the size of the child in one go.

In a preferred embodiment the common adjusting device comprises a tightening element, preferably a tightening strap, which is fitted in such a way that said tightening element can be pulled in order to tauten the belt assembly. By pulling the tightening element after the child has been placed in the seat and the belt assembly has been fitted and has been closed with the closing elements, it is very simple to tauten the various parts of the belt assembly such as the shoulder belt parts by pulling on the tightening element.

In a special preferred embodiment a first and a second aperture are provided in the backrest at the same height and at a distance from each other, through which apertures the shoulder belt parts extend, and the shoulder belts are composed of a single belt strap with a first closing element which is freely movable along it, which belt strap near the first aperture is anchored relative to the backrest, and beyond the second aperture can be fixed relative to the backrest by a detachable anchoring means, so that a loop is formed, the end of the loop which is near the detachable anchoring means being connected to the tightening element. This preferred embodiment makes simple manufacture of the belt assembly possible.

Other and further embodiments of the invention will emerge in the description below with reference to the drawings.

DETAILED DESCRIPTION OF THE INVENTION

Figure 1:
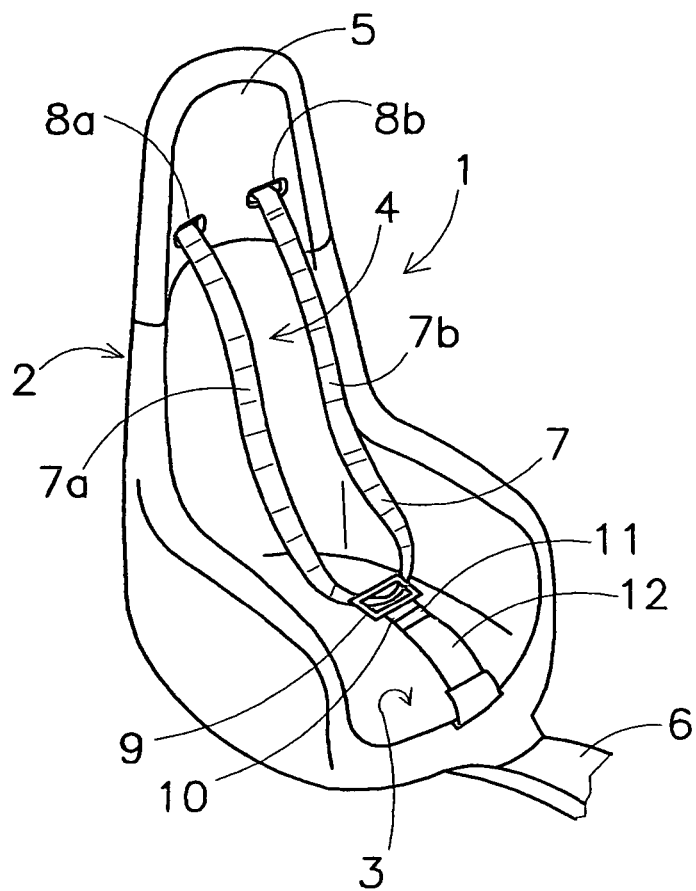
FIG. 1 shows a front view in perspective of a preferred embodiment of a child bicycle seat according to the invention.
Figure 2:
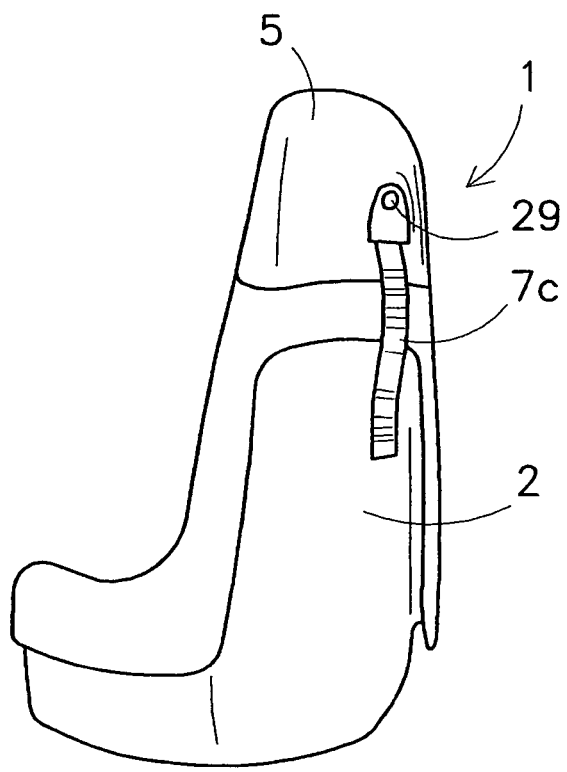
FIG. 2 shows a rear view in perspective of the child bicycle seat of FIG. 1.

FIG. 1 and FIG. 2 show a child bicycle seat 1 which is suitable for fitting on a bicycle. The illustrated seat is suitable for placing on a luggage carrier. It is pointed out, however, that the invention is not restricted to the type of child bicycle seat shown, but also relates to other child bicycle seats, for example of the type which can be fixed to bicycle handlebars or of the type which can be fitted directly on the frame, for example on a bicycle without luggage carrier.

Figure 3:
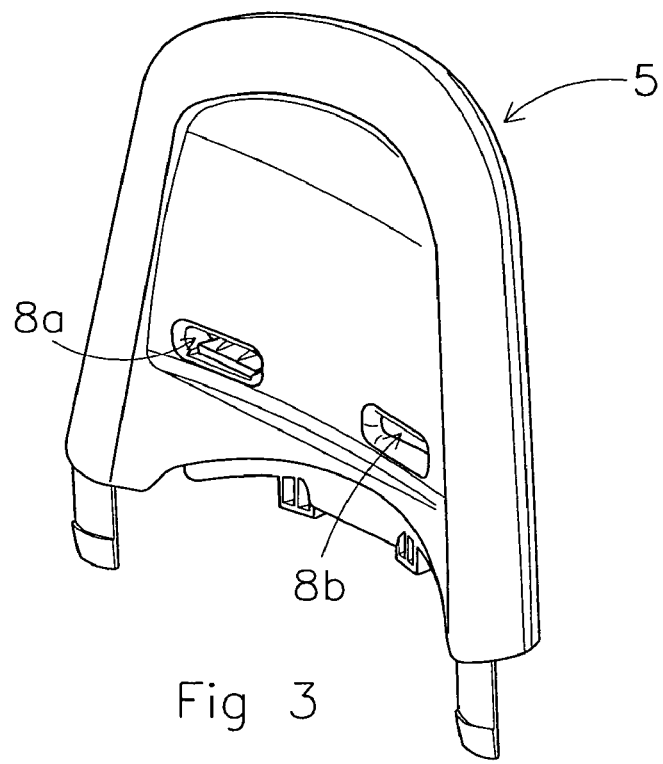
FIG. 3 shows a front view in perspective of a headrest of the child bicycle seat of FIG. 1.

The child bicycle seat 1 has a base part 2, which comprises a shell made of plastic, preferably by injection moulding. The base element 2 has a seating surface 3 and a base backrest 4. Fitted on the upper side of the base backrest 4 is a separately manufactured headrest 5, which is shown separately in FIG. 3 and which will be discussed in greater detail further on in the description. The base backrest 4 and the headrest 5 together form the backrest of the child bicycle seat 1.

Figure 4:
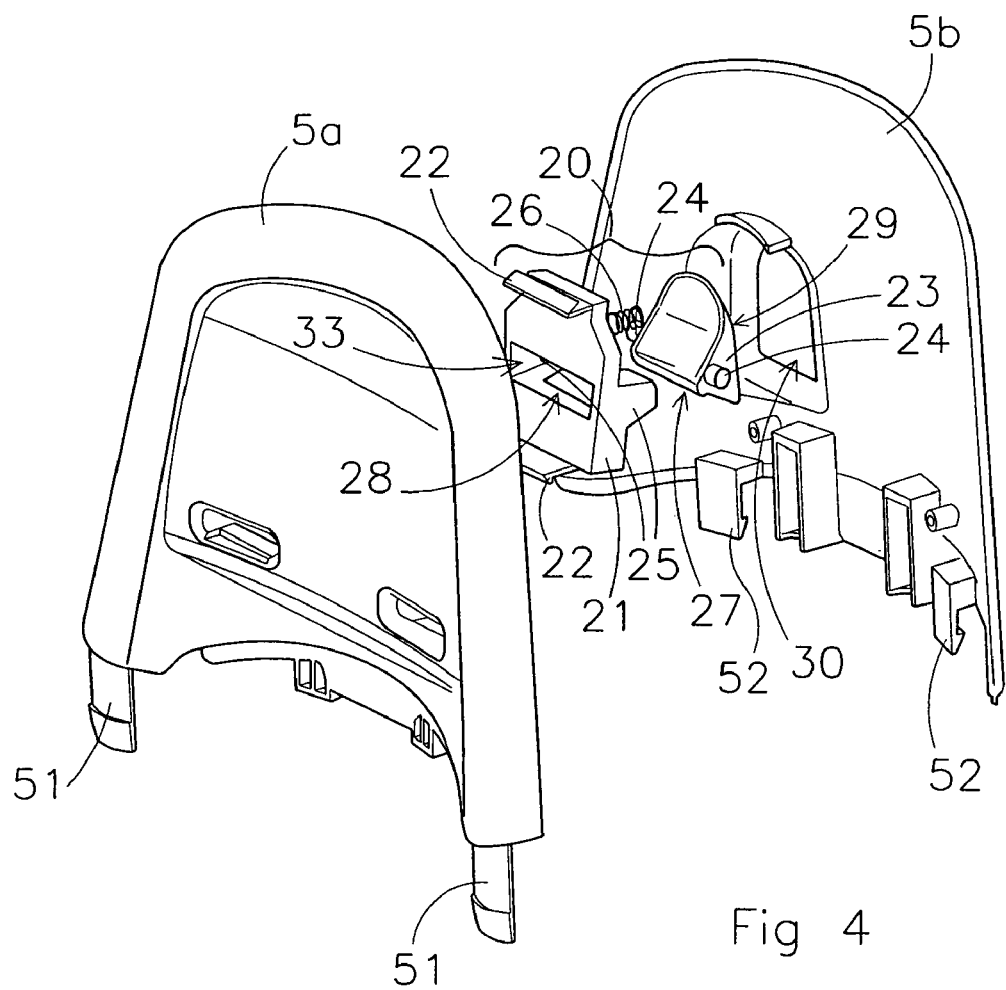
FIG. 4 shows a view in disassembled parts of the headrest of FIG. 3.

As shown in FIG. 4, the headrest 5 in the preferred embodiment is composed of two plastic shells, preferably made by injection moulding, in particular a front shell 5a and a rear shell 5b. The shells 5a and 5b are each provided with snap elements 51 and 52, by means of which they are snapped onto the base element 2. The shells 51 and 52 are connected to each other, for example by screws or by means of a snap connection. In the assembled state a space is present between the front and rear shells 5a, 5b.

A fixing means 6 which is known per se, and which is partially shown in FIG. 1, is fitted on the base element 2 of the child bicycle seat 1. Said fixing means 6 is designed to fix the seat 1 on the bicycle.

The child seat 1 is provided with a belt assembly comprising two shoulder belt parts 7a and 7b. The shoulder belt parts 7a and 7b are each formed by half of a through-going belt strap 7, the ends of which are inserted on the upper side through apertures 8a, 8b in the headrest 5. The apertures 8a, 8b are situated at a distance from each other and at the same height. Fitted on the belt strap 7 is a closing element 10 with a moulded-on ring 9 through which the belt strap 7 can move freely. Said closing element 10 can be connected to a second closing element 11, which is connected to the seating surface 3 of the seat 2.

The second closing element 11 is connected to the seat 2 by means of a flexible element 12, such as, for example, a crotch belt part or the like. The flexible element 12 with the closing element 11 lies between the legs of the child placed in the seat 2 when the latter is in use.

The end part of the shoulder belt part 7b extends through the aperture 8b and is anchored on the inside of the headrest by means of an anchoring means.

The end part of the other shoulder belt part 7a extends towards the rear through the aperture 8a and through the headrest 5. The tightening part 7c of the belt strap 7 is then situated on the rear side of the headrest. As shown in FIG. 4, a detachable anchorage 20 which acts upon the tightening element 7c of the belt strap 7 is fitted in the headrest 5 in the space between the front and rear shells 5a, 5b. The detachable anchorage 20 in the preferred embodiment illustrated comprises a first clamping element 21, which is connected to the front shell 5a of the headrest 5, for example by means of snap elements 22. The first clamping element 21 has a feed-through aperture 33. On the rear side of the first clamping element 21 a clamping surface 28 is present below the feed-through aperture 33. The detachable anchorage 20 furthermore comprises an operable second clamping element 23, which is provided with pin ends 24 by means of which it is pivotally mounted in hinge pieces 25 of the first clamping element 21. The clamping element 23 has a clamping surface 27 to act upon the belt 7. A spring 26 is fitted between the first clamping element 21 and the clamping element 23, which spring ensures that the clamping surface 27 of the operable clamping element 23 is pressed against the first clamping element 21.

The operable clamping element 23 has an operating surface 29, which is situated on the rear side of the headrest 5, as can be seen in FIG. 2, and serves as an operating button.

In the assembled state the belt 7 is fed through the aperture 8a towards the rear and then up along the element 21 to the feed-through aperture 33, and then back down through between the clamping surfaces 27 and 28 and along the underside of the operable clamping element 23 towards the rear through a feed-through aperture 30 in the rear side of the headrest 5. The spring 26 ensures that the tightening part 7c of the belt strap 7 is clamped between the clamping surfaces 27 and 28. On the front side of the backrest 4, 5 the belt strap 7 forms a loop.

The clamping elements are preferably of a self-releasing design, so that when a person tightens the shoulder belt parts 7a and 7b, the operable clamping element 23 does not have to be operated. However, if a person wishes to make the belt assembly looser, the operating surface 29 of the operable clamping element first has to be pressed, so that the clamping surfaces 27 and 28 move away from each other and the belt strap 7 can move freely through between them.

In order to tighten the shoulder belt parts 7a and 7b, the operable clamping element 23 can therefore be pressed and the tightening part 7c pulled. The belt strap 7 in the preferred embodiment is made in one piece and forms a loop, so that the two shoulder belt parts 7a and 7b are shortened to the same extent when the tightening part 7c is pulled.

Figure 5:
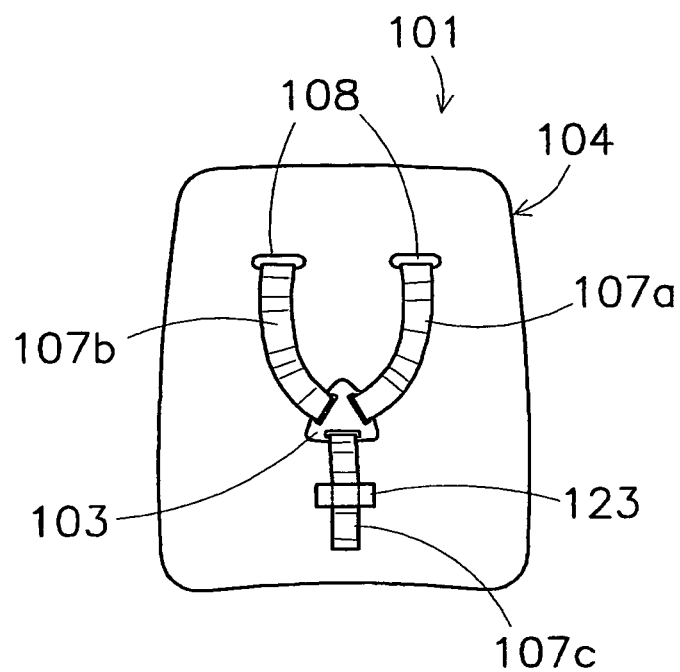
FIG. 5 shows a diagrammatic rear view of an alternative embodiment of a child bicycle seat according to the invention.

In an alternative embodiment, which is shown in FIG. 5, the belt of child bicycle seat 101 is composed of two shoulder belt parts 107a and 107b, which are connected to each other behind the backrest 104. A tightening element 107c is present in the form of a tightening belt which is connected by means of a substantially triangular connecting anchor 103 to the shoulder belt parts 107a and 107b. The tightening element 107c can be fixed relative to the backrest by means of a detachable anchoring means in the form of an operable clamping element 123.

As in the embodiment of FIGS. 1-4, for example, the clamping element 123 can be pressed by means of a spring (not shown) against the tightening element 107c in order to clamp down the latter. The clamping element 123 is preferably in the form of a push button which can be operated on the rear side of the backrest 104 in order to remove the clamping action and make the shoulder belts 107a, 107b longer and thus looser.

With the child bicycle seats 1 and 101 according to the invention it is very easy to secure a child in the belt assembly. Before the child is placed in the seat 1, 101, the shoulder belt parts 7a, 7b, 107a and 107b can be lengthened in order to make it easier to close the belt assembly. After the belt has been closed, said belt can be pulled more tightly around the child by operating the clamping element 23, 123 and pulling on the tightening element 7c, 107c. Since the tightening element 7c, 107c and also the operable clamping element 23, 123 are situated on the rear side of the backrest 4, 104 of the seat 1, 101; they are easily accessible and simple to operate.

Figure 6:
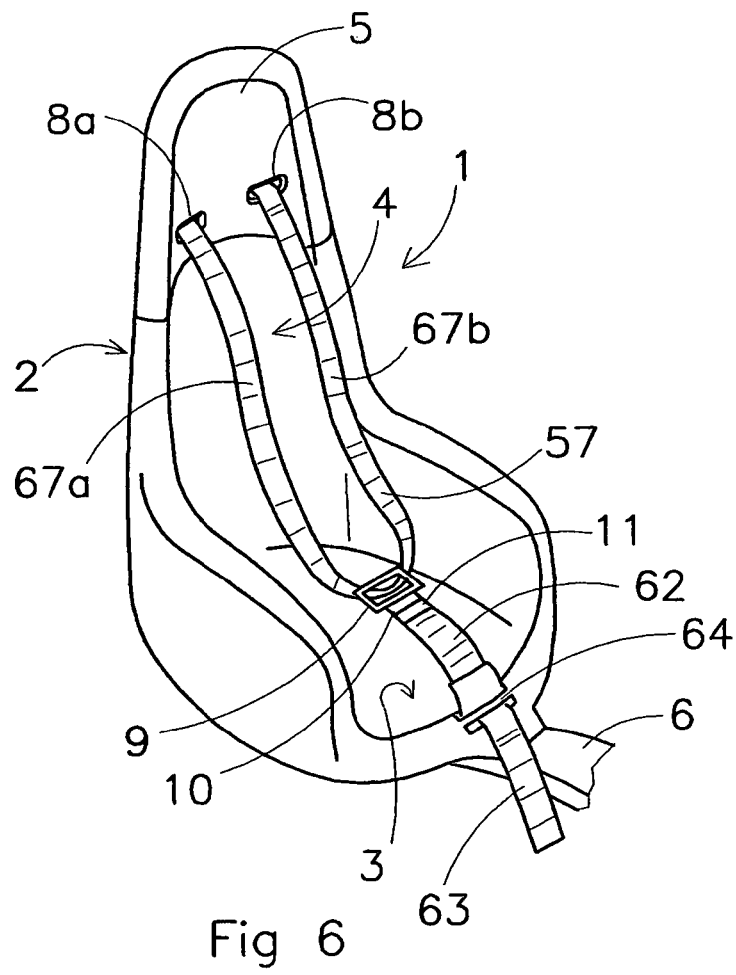
FIG. 6 shows a front view in perspective of yet another preferred embodiment of a child bicycle seat according to the invention.

In another alternative embodiment of the invention which is shown in FIG. 6, the belt assembly has a crotch belt part 63 on which the second closing element 11 is fitted. Parts corresponding to those of the embodiment of FIG. 1 are indicated by the same reference numerals. The shoulder belt parts 67a and 67b are anchored by their respective top ends relative to the backrest and form a loop of a fixed length. The first closing element 10 is movable over the loop by the ring 9. The crotch belt part 62 is connected to a tightening element 63 and can be tightened by pulling the latter, so that the shoulder belt parts 67a, 67b of the belt assembly are also tightened.

The tightening element 63 can be fixed relative to the seat by a detachable anchoring means which is comparable to that in the embodiments described above. The tightening element can be a tightening belt which preferably forms an integral part of the crotch belt part 62. The operable clamping element, not visible in FIG. 6, can be operated by means of an operating button 64 in order to loosen the belt assembly.

In the embodiments shown in FIGS. 1-5, the tightening part 7c, 107c and the operating button are situated on the rear side of the backrest of the seat. In FIG. 6 they are situated on the front side of the seating surface. However, it is also conceivable to have embodiments in which the operating button and/or the tightening element are situated on another part of the seat, for example on the side of the seat, or on the underside of the seating surface. Other positions are also possible, so long as these parts are easily accessible when a child has been placed in the seat.

What is claimed is:

1. A child bicycle seat comprising a seating surface and a backrest, fixing means for fixing the seat on a bicycle, and also a belt assembly for securing a child in the seat, which belt assembly comprises two shoulder belt parts which are connected by one end to the backrest, in which backrest a first and a second aperture are provided at the same height and at a distance from each other, through which apertures the shoulder belt parts extend, and wherein the shoulder belt parts are made of a single belt strap provided with a first closing element which is freely movable along it, wherein said single belt strap near the first aperture is anchored relative to the backrest, and beyond the second aperture can be fixed relative to the backrest by a detachable anchoring means, so that a loop is formed, the end of the loop which is near the detachable anchoring means being connected to a tightening element, wherein the detachable anchoring means comprises an operable clamping element which is pressed by means of a spring against the belt strap in order to clamp the latter, and which can be operated in order to remove the clamping action and to allow the loop to be varied freely in length, such that the child bicycle seat is provided with a common tautening device for tautening the belt assembly, and said child bicycle seat furthermore comprising a second closing element which can be connected to the first closing element of the shoulder belt parts and is connected to the seating surface of the seat.

2. Child bicycle seat according to claim 1, wherein the tightening element is fitted in such a way that said tightening element can be pulled in order to tauten the belt assembly.

3. Child bicycle seat according to claim 2, wherein the tightening element is fitted in such a way that in use it can be tightened from the rear side of the backrest.

4. Child bicycle seat according to claim 1, wherein the tightening element is a tightening strap.

5. Child bicycle seat according to claim 1, wherein the tightening element is an integral part of the belt strap.

6. Child bicycle seat according to claim 1, wherein the detachable anchoring means is fitted directly beside the second aperture in the backrest.

7. Child bicycle seat according to claim 1, wherein the detachable anchoring means comprises an operating button.

8. Child bicycle seat according to claim 7, wherein the operating button is situated on the rear side of the backrest.

9. Child bicycle seat according to claim 1, wherein the seat is made of a plastic shell.

10. Child bicycle seat according to claim 1, wherein a hollow space is present in the backrest, in which hollow space at least part of the tautening device is accommodated.

11. Child bicycle seat according to claim 1, wherein the backrest comprises a separately manufactured headrest part which in an assembled state is connected to a base part of the backrest.

12. Child bicycle seat according to claim 1, wherein the backrest comprises a separately manufactured headrest part which in an assembled state is connected to a base part of the backrest, the headrest part comprising a separate front and rear shell, which shells are connected to each other, thereby forming a hollow space between the front and rear shells of the headrest in which at least part of the tautening device is accommodated.

13. Child bicycle seat according to claim 1, wherein the backrest comprises a separately manufactured headrest part which in an assembled state is connected to a base part of the backrest, the first and second apertures being provided in the headrest part.

14. A child bicycle seat comprising a seating surface and a backrest, fixing means for fixing the seat on a bicycle, and also a belt assembly for securing a child in the seat, which belt assembly comprises two shoulder belt parts which are connected by one end to the backrest and are provided with a first closing element, and said bicycle seat furthermore comprising a second closing element which is connected to the seating surface of the seat and which can be connected to the first closing element of the shoulder belt parts, wherein the child bicycle seat is provided with a common tautening device for tautening the belt assembly, wherein the common tautening device comprises a tightening element, which is fitter in such a way that said tightening element can be pulled in order to tauten the belt assembly, wherein a first and a second aperture are provided in the backrest at the same height and at a distance from each other, through which apertures the shoulder belt parts extend, the belt being composed of shoulder belt parts, which are connected to each other behind the backrest, and wherein the tightening element is connected to the shoulder belt parts, wherein the tightening element can be fixed relative to the backrest or another part of the seat by a detachable anchoring means, said detachable anchoring means comprising an operable clamping element which is pressed by means of a spring against the tightening element in order to clamp the latter, and which can be operated in order to remove the clamping action and make the shoulder belts freely movable through the first and second apertures.

15. A child bicycle seat comprising a seating surface and a backrest, fixing means for fixing the seat on a bicycle, and also a belt assembly for securing a child in the seat, which belt assembly comprises two shoulder belt parts which are connected by one end to the backrest and are provided with a first closing element, and said child bicycle seat furthermore comprising a second closing element which is connected to the seating surface of the seat and which can be connected to the first closing element of the shoulder belt parts, wherein the child bicycle seat is provided with a common tautening device for tautening the belt assembly, wherein the common tautening device comprises a tightening element, which is fitted in such a way that said tightening element can be pulled in order to tauten the belt assembly, wherein a first and a second aperture are provided in the backrest at the same height and at a distance from each other, through which apertures the shoulder belt parts extend, the belt being composed of shoulder belt parts, which are connected to each other behind the backrest, and wherein the tightening element is connected to the shoulder belt parts, wherein the shoulder belt parts and the tightening element are connected to each other by means of a connecting anchor.

16. A child bicycle seat comprising a seating surface and a backrest, fixing means for fixing the seat on a bicycle, and also a belt assembly for securing a child in the seat, which belt assembly comprises two shoulder belt parts which are connected by one end to the backrest and are provided with a first closing element, and said child bicycle seat furthermore comprising a second closing element which can be connected to the first closing element of the shoulder belt parts and is connected to the seating surface of the seat, wherein the child bicycle seat is provided with a common tautening device for tautening the belt assembly, wherein the common tautening device comprises a tightening element, which is fitted in such a way that said tightening element can be pulled in order to tauten the belt assembly, wherein the belt assembly comprises a crotch belt part on which the second closing element is fitted, the crotch belt part being connected to the tightening element, the shoulder belt parts being anchored by their respective top ends relative to the backrest, and it being possible to tauten the crotch belt part in order to tauten the belt assembly, wherein the tightening element can be fixed relative to the seat by a detachable anchoring means, and wherein the detachable anchoring means comprises an operable clamping element which is pressed by means of a spring against the tightening element in order to clamp the latter, and which can be operated in order to remove the clamping action and make the crotch belt part freely movable.

17. A child bicycle seat comprising a seating surface and a backrest, fixing means for fixing the seat on a bicycle, and also a belt assembly for securing a child in the seat, which belt assembly comprises two shoulder belt parts which are connected by one end to the backrest and are provided with a first closing element, and said child bicycle seat furthermore comprising a second closing element which can be connected to the first closing element of the shoulder belt parts and is connected to the seating surface of the seat, wherein the child bicycle seat is provided with a common tautening device for tautening the belt assembly, wherein the common tautening device comprises a tightening element, wherein a first and a second aperture are provided in the backrest at the same height and at a distance from each other, through which apertures the shoulder belt parts extend, wherein the shoulder belts are made of a single belt strap with the first closing element which is freely movable along it, which belt strap near the first aperture is anchored relative to the backrest, and beyond the second aperture can be fixed relative to the backrest by a detachable anchoring means, so that a loop is formed, the end of the loop which is near the detachable anchoring means being connected to the tightening element, wherein the detachable anchoring means is designed in such a way that in a direction of movement of the tightening element wherein the belt assembly becomes looser, the anchoring means acts in a clamping manner upon the tightening element and in a direction of movement wherein the belt assembly is tightened, the tightening element is self releasing, so that the tightening element is freely movable in the tightening direction.

18. A child bicycle seat comprising a seating surface and a backrest, fixing means for fixing the seat on a bicycle, and also a belt assembly for securing a child in the seat, which belt assembly comprises two shoulder belt parts which are connected by one end to the backrest and are provided with a first closing element, and said child bicycle seat furthermore comprising a second closing element which can be connected to the first closing element of the shoulder belt parts and is connected to the seating surface of the seat, wherein the child bicycle seat is provided with a common tautening device for tautening the belt assembly, wherein the common tautening device comprises a tightening element, which is fitted in such a way that said tightening element can be pulled in order to tauten the belt assembly, wherein a first and a second aperture are provided in the backrest at the same height and at a distance from each other, through which apertures the shoulder belt parts extend, the belt being composed of shoulder belt parts, which are connected to each other behind the backrest, and wherein the tightening element is connected to the shoulder belt parts, wherein the tightening element, can be fixed relative to the backrest or another part of the seat by a detachable anchoring means, wherein the detachable anchoring means is designed in such a way that in a direction of movement wherein the belt assembly becomes looser, the anchoring means acts in a clamping manner upon the tightening element and in a direction of movement wherein the belt assembly is tightened, the tightening element is self-releasing, so that the tightening element is freely movable in the tightening direction.

19. A child bicycle seat comprising a seating surface and a backrest, fixing means for fixing the seat on a bicycle, and also a belt assembly for securing a child in the seat, which belt assembly comprises two shoulder belt parts which are connected by one end to the backrest and are provided with a first closing element, and said child bicycle seat furthermore comprising a second closing element which can be connected to the first closing element of the shoulder belt parts and is connected to the seating surface of the seat, wherein the child bicycle seat is provided with a common tautening device for tautening the belt assembly, wherein the common tautening device comprises a tightening element, which is fitted in such a way that said tightening element can be pulled in order to tauten the belt assembly, wherein the belt assembly comprises a crotch belt part on which the second closing element is fitted, the crotch belt part being connected to the tightening element, the shoulder belt parts being anchored by their respective top ends relative to the backrest, and it being possible to tauten the crotch belt part in order to tauten the belt assembly, wherein the tightening element can be fixed relative to the seat by a detachable anchoring means, wherein the detachable anchoring means is designed in such a way that in a direction of movement wherein the belt assembly becomes looser, the anchoring means acts in a clamping manner upon the tightening element and in a direction of movement wherein the belt assembly is tightened, the tightening element is self-releasing, so that the tightening element is freely movable in the direction of the tightening movement.

* * * * *